(12) United States Patent
Takayama et al.

(10) Patent No.: US 10,391,911 B2
(45) Date of Patent: Aug. 27, 2019

(54) COMPOSITE SEAT CORE MATERIAL AND VEHICULAR SEAT ELEMENT USING THE COMPOSITE SEAT CORE MATERIAL

(71) Applicant: JSP CORPORATION, Chiyoda-ku, Tokyo (JP)

(72) Inventors: Atsuo Takayama, Kanuma (JP); Keiichi Hashimoto, Utsunomiya (JP); Motoaki Ueguri, Nikko (JP)

(73) Assignee: JSP CORPORATION, Tokyo (JP)

( * ) Notice: Subject to any disclaimer, the term of this patent is extended or adjusted under 35 U.S.C. 154(b) by 26 days.

(21) Appl. No.: 15/750,854

(22) PCT Filed: Jul. 22, 2016

(86) PCT No.: PCT/JP2016/071535
§ 371 (c)(1),
(2) Date: Jun. 15, 2018

(87) PCT Pub. No.: WO2017/026244
PCT Pub. Date: Feb. 16, 2017

(65) Prior Publication Data
US 2018/0319304 A1 Nov. 8, 2018

(30) Foreign Application Priority Data

Aug. 12, 2015 (JP) ................. 2015-159443

(51) Int. Cl.
*B60N 2/90* (2018.01)
*B32B 5/32* (2006.01)
(Continued)

(52) U.S. Cl.
CPC ................ *B60N 2/90* (2018.02); *B29C 44/04* (2013.01); *B29C 44/06* (2013.01);
(Continued)

(58) Field of Classification Search
CPC .... B60N 2/90; B60N 2/64; B32B 5/32; B32B 5/20; B32B 2266/0278; B32B 2605/00;
(Continued)

(56) References Cited

U.S. PATENT DOCUMENTS

| 5,622,756 | A | 4/1997 | Tokoro |
| 9,079,360 | B2 | 7/2015 | Nohara |
| 2012/0115968 | A1 | 5/2012 | Shima et al. |

FOREIGN PATENT DOCUMENTS

| JP | 55-11841 S | 1/1980 |
| JP | 55-046938 | 4/1980 |

(Continued)

OTHER PUBLICATIONS

Supplementary European Search Report in corresponding European Application No. 16834941, dated Apr. 2, 2019.
(Continued)

*Primary Examiner* — Michael C Miggins
(74) *Attorney, Agent, or Firm* — Bacon & Thomas, PLLC

(57) ABSTRACT

A composite seat core material is configured from: a base portion that is formed by fusing thermoplastic resin foamed particles having no through-hole to each other; and a connecting portion that is provided on the upper side of the base portion, and is formed by fusing foamed particles having through-holes to each other, the connecting portion having interconnected void spaces that communicates with the outside. With the outer surface of the connection portion partially exposed at the top surface of the composite seat core material, the base portion and the connecting portion are fixed and integrated with each other. A seat member is formed by laminating a polyurethane foam pad on the top surface of the composite seat core material.

5 Claims, 3 Drawing Sheets

(51) Int. Cl.
  *B32B 5/20* (2006.01)
  *B60N 2/64* (2006.01)
  *B29C 67/20* (2006.01)
  *B29C 44/04* (2006.01)
  *B29C 44/06* (2006.01)
  *B29C 44/34* (2006.01)
  *B29C 44/44* (2006.01)
  *B29K 23/00* (2006.01)
  *B29K 75/00* (2006.01)
  *B29L 31/00* (2006.01)

(52) U.S. Cl.
  CPC ........ *B29C 44/3426* (2013.01); *B29C 44/445* (2013.01); *B29C 67/205* (2013.01); *B32B 5/20* (2013.01); *B32B 5/32* (2013.01); *B60N 2/64* (2013.01); *B29K 2023/12* (2013.01); *B29K 2075/00* (2013.01); *B29L 2031/771* (2013.01); *B32B 2266/0278* (2013.01); *B32B 2605/00* (2013.01)

(58) Field of Classification Search
  CPC ....... B29C 67/205; B29C 44/04; B29C 44/06; B29C 44/3426; B29C 44/445; B29K 2023/12; B29K 2075/00; B29L 2031/771
  See application file for complete search history.

(56) References Cited

FOREIGN PATENT DOCUMENTS

| | | |
|---|---|---|
| JP | 55-053538 | 4/1980 |
| JP | 57-047629 | 3/1982 |
| JP | 61-130026 | 6/1986 |
| JP | 05-116226 | 5/1993 |
| JP | 05-031974 Y2 | 8/1993 |
| JP | 07-137063 | 5/1995 |
| JP | 08-108441 A | 4/1996 |
| JP | 2011-036469 | 2/2011 |
| JP | 2012-126816 | 7/2012 |
| JP | 2012-171104 A | 9/2012 |

OTHER PUBLICATIONS

International Search Report on PCT/JP2016/071535 dated Sep. 20, 2016.

COMPOSITE SEAT CORE MATERIAL AND VEHICULAR SEAT ELEMENT USING THE COMPOSITE SEAT CORE MATERIAL

The present invention relates to a composite seat core material and to a vehicular seat element using the composite seat core material.

BACKGROUND OF THE INVENTION

A vehicular seat element composed of a plurality of laminated different materials has been hitherto used as a seat for use in automobiles, etc. One example of such a seat element is a laminate composed of a cushion layer (pad) that is formed of a material having cushioning property and a substrate layer that is formed of a light-weight material and that has higher strength and rigidity as compared with the cushioning layer.

As the material from which the cushioning layer is formed, there is used, for example, a soft polyurethane foam that is configured to provide an occupant sitting thereon with good comfort and snug fit around the hip.

As the material from which the substrate layer is formed, on the other hand, there has been used, for example, a hard polyurethane foam. In recent years, however, a foam of a thermoplastic resin such as a styrene-based resin, an ethylene-based resin or a propylene-based resin has been used so that it has become possible to supplement the strength and rigidity of the cushioning layer and achieve weight reduction of the vehicular seat element. Thus, by laminating a cushioning layer of a soft polyurethane foam and a substrate layer of a thermoplastic resin foam together, it has become possible to obtain a vehicular seat element having composite properties.

As a method for producing such a vehicular seat element, there is a method using a mold. To be more specific, there is a method in which a previously prepared member (a thermoplastic resin foamed body) for forming a substrate layer is disposed in a mold cavity defined in a mold and in which a liquid raw material for forming a polyurethane foam is filled in the mold cavity in which the above member has been disposed, and is caused to foam to prepare a cushioning layer, thereby directly forming (laminating) the cushioning layer on a surface of the substrate layer.

However, because a cushioning layer formed of a polyurethane foam has poor adhesion property to a foamed body of a thermoplastic resin such as a propylene-based resin that forms a substrate layer, investigation is being made for suppressing the delamination between the polyurethane foam and the substrate layer. For example, Patent Document 1 proposes a method for producing a laminate in which that region of a surface of an expandable thermoplastic resin expanded beads foamed body which is to be contacted by a polyurethane foam layer, is heated at a temperature that is at least 80% of the softening temperature of the foamed body to soften and expand the expandable resin beads which constitute the contact region and to form undulations in the contact region. The polyurethane foam is then formed such that it enters into the recesses of the undulations.

RELATED ART DOCUMENTS

Patent Document

Patent Document 1: Japanese Laid Open Patent Publication No. JP-A-2012-171104

SUMMARY OF THE INVENTION

In the laminate produced by the production method of Patent Document 1, however, the bonding strength between the polyurethane foam and the thermoplastic resin foamed body is not fully satisfactory. It is thus difficult to surely suppress the delamination between the layers. For example, when such a laminate is used as a seat for an automobile, delamination between the polyurethane foam and the substrate layer is apt to occur. There is, therefore, a possibility that problems of deterioration of sitting comfort and snug fit of the occupant and of generation of frictional sounds between the layers due to delamination thereof occur.

With a view toward solving the above delamination problem, the present inventors have attempted to integrally laminate a polyurethane foam to a substrate formed of an expanded beads molded body. The molded body is obtained by in-mold molding of thermoplastic resin particles having through holes and has void spaces that are communicated with the outside.

The obtained product is a laminate in which the polyurethane foam and the substrate are integrally laminated by impregnating, foaming and solidifying a polyurethane foam forming raw material liquid in the void spaces of the substrate of the expanded beads molded body. The laminate was found to excel in adhesion properties between the substrate and the polyurethane foam and to have less tendency to cause delamination, because part of the polyurethane foam is impregnated, foamed and solidified within the void spaces that are present on a surface side thereof.

It has been revealed, however, that when the polyurethane foam is integrally laminated with the substrate which is an expanded beads molded body having void spaces that are in communication with the outside, deformation such as warp of the expanded beads molded body occurs depending upon the density of the expanded beads molded body. The reason for this is considered to be because the polyurethane foam is physically tightly bonded to the expanded beads molded body, because the degree of shrinkage of them differs from each other and additionally because there is thermal influence at the time of foaming of the polyurethane foam.

The present invention is aimed at the provision of a composite seat core material that is adapted to be integrally laminated with a polyurethane foam pad by foaming polyurethane in a mold, that excels in bonding strength to the polyurethane foam pad and that is able to suppress deformation such as warp which might occur by lamination with the polyurethane pad, and at the provision of a vehicular seat element using the composite seat core material.

In accordance with the present invention, there are provided the following composite seat core material and vehicular seat element:

[1] A composite seat core material, comprising:

a foamed molded substrate that comprises a multiplicity of first thermoplastic resin expanded beads which are fusion-bonded to each other and free of through-holes, and a foamed molded connecting member that comprises a multiplicity of second thermoplastic resin expanded beads each having a through-hole, said second thermoplastic resin expanded beads being fusion-bonded to each other such that interconnected void spaces which communicate with an outer surface of the foamed molded connecting member and which include part of the through-holes of the second thermoplastic resin expanded beads, are defined in the foamed molded connecting member, the foamed molded connecting member being integrally bonded to the foamed molded substrate in such a state that a part of said outer surface of the foamed molded connecting member is exposed on an upper surface of the composite seat core material.

[2] The composite seat core material according to above [1], wherein the foamed molded connecting member has an average voidage of 10% by volume or more.

[3] The composite seat core material according to above [1] or [2], wherein the foamed molded connecting member has a volume that is 5 to 50% of the volume of the composite seat core material.

[4] The composite core material according to any one of above [1] to [3], wherein the foamed molded substrate is substantially free of void spaces.

[5] A vehicular seat element, comprising:
the composite seat core material according to above [1], and
a polyurethane foam pad provided on the upper surface of the composite seat core material,
wherein said polyurethane foam pad has portions impregnated through said outer surface of the foamed molded connecting member into part of the void spaces of the foamed molded connecting member.

The composite seat core material of the present invention, which comprises the above-described substrate and the above-described connecting member, shows excellent bonding strength to the polyurethane foam pad and shows suppressed deformation such as warp when laminated with the polyurethane foam pad. The vehicular seat element of the present invention shows excellent cushioning properties and suppressed delamination between the core material and the polyurethane foam pad and, moreover, has suppressed deformation such as warp of its composite seat core material.

DETAILED DESCRIPTION OF THE INVENTION

Figure 1:
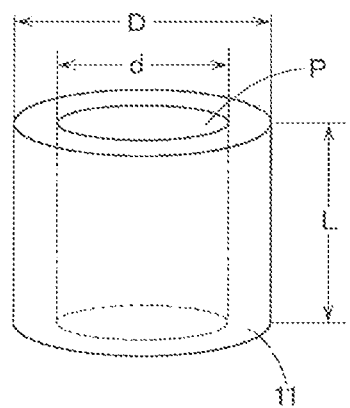
FIG. 1 is a schematic view showing an example of a shape of a thermoplastic resin expanded bead having a through hole.

The composite seat core material according to the present invention and the vehicular seat element having a polyurethane pad provided on the composite seat core material will be described in detail below. The term "seat element" as used herein is intended to refer to a seat cushion on which an occupant sits, a seat back which supports the back of the occupant, a head rest and/or an arm rest. Description will be hereinafter made of a seat element used as a seat cushion.

The composite seat core material (hereinafter occasionally referred to simply as "core material") used for the vehicular seat element of the present invention has a foamed molded substrate (hereinafter occasionally referred to simply as "substrate") that comprises a multiplicity of thermoplastic resin expanded beads which are fusion-bonded to each other, and a foamed molded connecting member (hereinafter occasionally referred to simply as "connecting member") that is provided on an outer surface of the substrate and that comprises a multiplicity of thermoplastic resin expanded beads which are fusion-bonded to each other.

The vehicular seat element of the present invention is mounted on a vehicle in such a state that the substrate, connecting member and a polyurethane foam pad (hereinafter occasionally referred to simply as "pad") thereof are arranged in this order from below. When the vehicular seat element is used as a seat cushion, the term "upper surface" of the core material as used herein is intended to refer to a surface on the top side of the seat cushion, namely a surface on the side on which a passenger sits. When the vehicular seat element is used as a seat back, the term "upper surface" of the core material as used herein is intended to refer to a surface on the side against which a passenger leans.

The substrate which constitutes the composite seat core material of the present invention is formed of an expanded beads foamed molded body which comprises thermoplastic resin expanded beads which are free of through-holes (hereinafter occasionally referred to simply as first expanded beads) and which are fusion-bonded to each other. Because the substrate is formed of the expanded beads which are free of through-holes, the core material has excellent rigidity and is able to be prevented from being warped at the time of lamination of a pad thereon. Further, a raw material liquid of a polyurethane foam is prevented from impregnating into the substrate at the time of production of a vehicular seat element, which will be described later, it is possible to control the amount of the pad impregnated into the connecting member. Thus, it is possible to prevent variation of the density of the pad.

It is preferred that the substrate which constitutes the composite seat core material is substantially free of void spaces. Generally, however, even when a foamed body is formed of expanded beads that are free of void spaces, the voidage of the substrate which is determined by a method described hereinafter is not 0%, because fine void spaces may remain present between expanded beads. Thus, the term "substantially free of void spaces" as used herein is intended to mean that the substrate has an average voidage of 8% by volume or less. It is more preferred that the substrate has an average voidage of 6% by volume or less.

As a base resin of the first expanded beads that constitute the substrate there may be used any thermoplastic resin. The thermoplastic resin may be, for example, one or more of a polyproylene-based resin, such as an ethylene-propylene copolymer, a propylene-butene copolymer, an ethylene-propylene-butene terpolymer and a polypropylene homopolymer; a polyethylene-based resin, such as low density polyethylene, medium density polyethylene, high density polyethylene, linear low density polyethylene, ultralow density polyethylene, an ethylene-vinyl acetate copolymer, an ethylene-methyl methacrylate copolymer and an ionomer resin obtained by crosslinking between the molecules of an ethylene-methacrylic acid copolymer with metal ion; polybutene; and polypentene. Above all, for reasons of good recovery property after being compressed, low density polyethylene, medium density polyethylene, high density polyethylene, linear low density polyethylene, ultralow density polyethylene, polypropylene, polybutene, an ethylene-propylene copolymer, a propylene-butene copolymer, an ethylene-propylene-butene terpolymer, etc. are preferred. Incidentally, the copolymer and terpolymer may be a random copolymer or a block copolymer, with the random copolymer being more preferred.

The thermoplastic resin may be cross-linked by using a peroxide or radiation, although it may be in a non-cross-linked state. From the standpoint of number of production steps and recyclability, however, a non-cross-linked thermoplastic resin is preferred.

Further, the thermoplastic resin may be colored in black, gray, brown, etc. by addition of a coloring pigment or a dye.

The connecting member which constitutes the composite core material of the present invention is an expanded beads foamed molded body that comprises a multiplicity of thermoplastic resin expanded beads each of which has a through-hole (hereinafter occasionally referred simply as second expanded beads) and which are fusion-bonded to each other. The connecting member has interconnected void spaces which communicate with an outer surface thereof. The interconnected void spaces of the connecting member include the through-holes of the second expanded beads and interstices between the plurality of the second expanded beads which are fusion-bonded to each other, with through-holes of the second expanded beads being the majority of the interconnected void spaces.

Because the interconnected void spaces of the connecting member are in communication with the outer surface of the connecting member, a liquid is able to be impregnated into the interconnected void spaces through the outer surface. Therefore, when a vehicular seat element having a polyurethane foam pad is produced as described hereinafter, a raw material liquid of the polyurethane foam can be impregnated into the interconnected void spaces through the outer surface and foamed therein. By this, it is possible to tightly bond the polyurethane foam pad to the connecting member. A molded body of expanded beads having such through-holes generally has a low rigidity because of the presence of the void spaces. The core material of the present invention, however, can suppress its deformation at the time of foaming lamination of a polyurethane foam, since the core material is constituted of a molded body of the second expanded beads which has void spaces and a molded body of the first expanded beads having no through-holes.

As the thermoplastic resin that constitutes the connecting member, there may be mentioned the above-described thermoplastic resins used to form the substrate. However, the thermoplastic resin of the connecting member may be the same as that of the substrate, or may be different from that of the substrate.

As the second expanded beads, there may be mentioned, for example, those which are cylindrical and in which (a) the shape of the outer periphery and the shape of the hollow portion thereof are both circular, (b) the shape of the outer periphery and the shape of the hollow portion thereof are both polygonal, (c) the shape of the outer periphery is circular and the shape of the hollow portion is polygonal, (d) the shape of the outer periphery is polygonal and the shape of the hollow portion is circular, and (e) the shapes of (a) to (d) are each connected at its periphery. Here, the term "circular" is intended to include elliptical and oval and the term "polygonal" is intended to include rounded polygonal.

The shape of the cylindrical expanded beads and the dimensions of the hollow portion may be designed as appropriate. For instance, an example of the cylindrical bead in which the outer peripheral shape of the second expanded bead and the shape of the hollow portion are both circular is preferably a cylindrical bead as illustrated in schematic illustration of FIG. 1. It is preferred that the outer diameter D of the cylindrical expanded bead 11 is 2 to 6 mm, the inner diameter d (diameter of the hollow portion P) is 1 to 5 mm, and the length L is 2 to 6 mm. When the dimensions of the cylindrical expanded beads fall within the above range, the bonding strength between the pad and the connecting member is further improved as described hereinafter. In the above case, it is more preferred that D/L is 0.8 to 1.2 and the inner diameter d is 1.5 mm or more, since the bonding strength between the pad and the connecting member is further improved It is preferred that the connecting member has an average voidage of 10% by volume or more. When the average voidage is 10% by volume or more, it becomes easy to ensure the desired bonding strength between the polyurethane pad and the connecting member as described hereinafter. When the average voidage exceeds 40% by volume, on the other hand, there is a possibility that the mechanical strength of the connecting member becomes insufficient. From the above point of view, the average voidage of the connecting member is more preferably 12 to 35% by volume, particularly preferably 15 to 30% by volume.

As used herein the term "average voidage" of a foamed molded body such as the substrate and the connecting member is intended to mean a value calculated using the following equation:

$$\text{Voidage (\% by volume)} = [(X-Y)/X] \times 100$$

in which X is an apparent volume (cm$^3$) of the molded body and Y is a true volume (cm$^3$) of the molded body. The apparent volume X is a volume calculated from the outer dimensions of the foamed molded body. The true volume Y is a real volume of the foamed molded body in which the void spaces are excluded. The true volume may be determined by immersing the foamed molded body in a liquid (such as an alcohol) and measuring a volume of the liquid that has been increased by the immersion.

Figure 2:
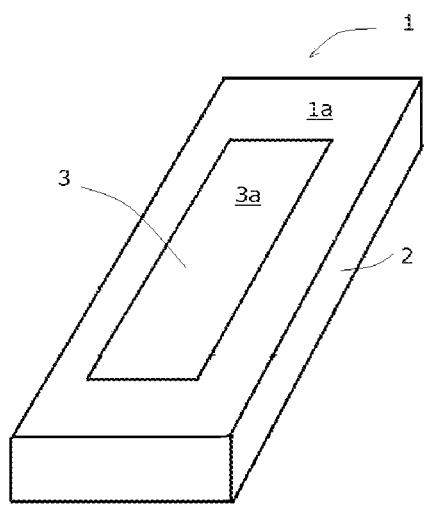
FIG. 2 is a perspective view schematically illustrating an embodiment of a composite seat core material according to the present invention.

One embodiment of the core material 1 of the present invention that is constituted as described above is shown in FIG. 2. In FIG. 2, the reference numeral 1 designates a core material which is composed of a substrate 2 and a connecting member 3. The core material 1 has an upper surface 1a. The substrate 2 comprises a multiplicity of first expanded beads that are fusion-bonded to each other. The connecting member 3 comprises a multiplicity of second expanded beads each having a through-hole. The second expanded beads are fusion-bonded to each other such that interconnected void spaces (not shown) which communicate with an outer surface of the connecting member 3 are formed. The interconnected void spaces include a part of the through-holes of the second expanded beads. The connecting member 3 is integrally bonded to the substrate 2 in such a state that a part of the outer surface 3a of the connecting member 3 is exposed on the upper surface 1a of the core material 1.

In the core material 1 of the present invention, it is necessary that a part of the outer surface 3a of the connecting member 3 is exposed on the upper surface 1a of the core material 1. When a part of the outer surface 3a of the connecting member 3 is exposed on the upper surface 1a of the core material 1, a raw material of a polyurethane foam can enter into the interconnected void spaces through the outer surface 3a at the time the polyurethane foam is formed on the upper surface 1a. When the polyurethane foam raw material is subsequently caused to foam and solidify, the pad is integrated with the core material 1. The embodiment in which the outer surface 3a of the connecting member is exposed on the upper surface 1a of the core material is not specifically limited. Examples of such embodiments are shown in FIG. 3 to FIG. 6.

Figure 3:
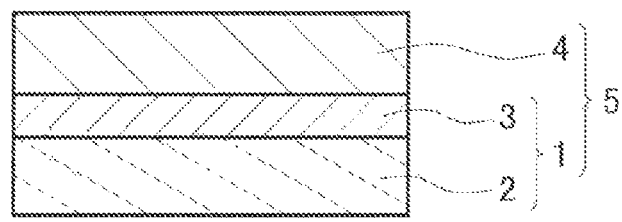
FIG. 3 is a vertical cross-sectional view schematically illustrating an embodiment of a vehicular seat element according to the present invention.
Figure 4:
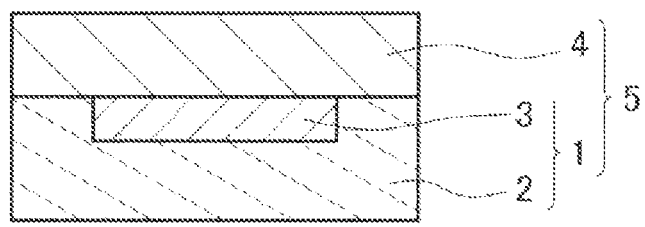
FIG. 4 is a vertical cross-sectional view schematically illustrating a further embodiment of a vehicular seat element according to the present invention.
Figure 5:
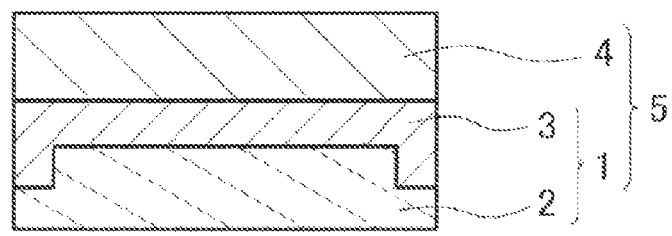
FIG. 5 is a vertical cross-sectional view schematically illustrating a further embodiment of a vehicular seat element according to the present invention.
Figure 6:
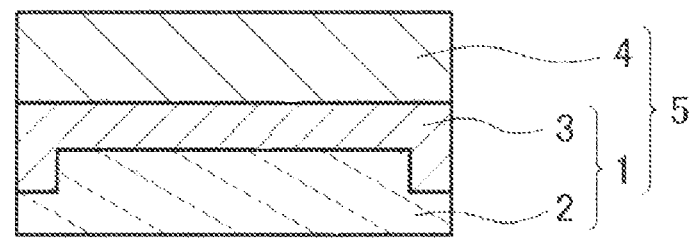
FIG. 6 is a vertical cross-sectional view schematically illustrating a further embodiment of a vehicular seat element according to the present invention.

FIG. 3 is a diagrammatic vertical cross-sectional view of a vehicular seat element 5. An outer surface of a connecting member 3 is exposed on the entire upper surface of a core material 1. A polyurethane foam pad 4 is formed to cover the entire upper surface of the core material 1 (namely, the entire exposed outer surface of the connecting member 3). In a vehicular seat element 5 of FIG. 4, a part of an outer surface of a connecting member 3 is exposed on a center region of an upper part of a core material 1. A pad 4 is formed to cover the entire upper surface of the core material 1. A vehicular seat element 5 of FIG. 5 is similar to that of FIG. 3, but in this embodiment, a connecting member 3 is formed to additionally cover a side surface of a substrate 2. In a vehicular seat element 5 of FIG. 6, a connecting member 3 is formed into plural divided sections. An outer surface of each of the sections is exposed on an upper surface of a core material 1. A pad 4 is formed to cover the entire upper surface of the core material 1. In FIG. 3 to FIG. 6, the reference numeral 2 designates a substrate. Thus, the upper surface 1a (FIG. 2) of the composite seat core material 1 may be formed only by the connecting member 3 as shown in FIG. 3 and FIG. 5 or, alternatively, may be formed by the connecting member 3 and the substrate 2 as shown in FIG. 2, FIG. 4 and FIG. 6. The form and configuration of the upper surface 1a of the core material 1 are not specifically limited. The upper surface 1a may be flat, curved or bent and its planar shape may be rectangular, polygonal, circular, etc. and determined as appropriate according to the structure of the seat element.

Further, in the core material 1 of the present invention, the substrate 2 and the connecting member 3 have to be integrally bonded to each other. By this, the obtained core material 1 has excellent strength, which finally makes it possible to obtain a vehicular seat element 5 having excellent strength. A method for bonding the substrate 2 and connecting member 3 together is not specifically limited. There may be mentioned, for example, a method in which the substrate 2 and connecting member 3 are molded integrally using, as thermoplastic resins of which they are constituted, similar kinds of resins that can be fusion-bonded to each other, a method in which they are first separately prepared and, in a subsequent step, fusion-bonded together or bonded together with an adhesive. In an alternative, they are mechanically integrally united together by forming the connecting member in dovetail grooves formed in the substrate as shown in FIG. 6.

It is preferred that the volume percentage of the connecting member in the core material of the present invention is 5 to 50% by volume. When the volume percentage of the connecting member is within the above range, it becomes possible to achieve more reliable bonding of a pad to the connecting member while suppressing deformation such as warp at the time of lamination with the pad.

From the above point of view, the lower limit of the volume percentage of the connecting member is more preferably 10% by volume, still more preferably 15% by volume. The upper limit thereof is more preferably 40% by volume, still more preferably 30% by volume.

It is preferred that the connecting member has a thickness of 5 mm or more, more preferably 10 mm or more, from the standpoint of bonding force thereof to the pad. When there is a variation in impregnation amount of the pad in the vehicular seat elements, a variation in density is caused in the pads. Thus, from the standpoint of control of the impregnation amount, the thickness of the connecting member is preferably 30 mm or less, more preferably 25 mm or less.

It is preferred that the substrate has an apparent density of 10 to 90 $kg/m^3$, more preferably 20 to 60 $kg/m^3$, from the standpoint of balance between the lightness in weight and mechanical strength and of effective suppression of deformation by the lamination of the pad. The apparent density of the connecting member, on the other hand, is preferably 10 to 90 $kg/m^3$, more preferably 20 to 60 $kg/m^3$, from the standpoint of the mechanical strength of the composite seat core material. As used herein, the term "apparent density" of the expanded beads molded body, such as the connecting member and substrate, is intended to refer to a value determined by dividing the weight of the molded body by the volume thereof that is calculated from the external dimensions thereof.

Description will be next made of the vehicular seat element of the present invention.

The vehicular seat element of the present invention comprises the above-described composite seat core material, and a pad that covers an upper surface of the core material. Part of the pad is impregnated and solidified in the interconnected void spaces of the connecting member which constitutes the core material. The vehicular seat element of the present invention has cushioning properties because of the pad that covers its upper surface and is excellent in strength and rigidity because of the presence of the core material that is formed of a light weight material and is provided underneath thereof. Further, because part of the pad is impregnated and solidified in the interconnected void spaces of the connecting member and is integrated therewith, the pad and the core material are tightly bonded to each other. Therefore, delamination between them is prevented. Furthermore, because the core material has the above-described structure that is peculiar to the present invention, deformation such as warp is prevented.

Description will be next made of a method for fabricating the composite seat core material of the present invention and the vehicular seat element using the core material.

The core material of the present invention may be obtained by undergoing the following steps.
(1) A step of producing a substrate which comprises the first expanded beads fusion-bonded to each other;
(2) A step of producing a connecting member which comprises the second expanded beads fusion-bonded to each other and which has interconnected void spaces being in communication with an outer surface thereof;
(3) A step of producing a composite seat core material by disposing the connecting member on an upper side of the substrate and integrally bonding them;
(4) A step of integrally laminating the core material with a polyurethane foam pad, wherein a liquid raw material for a polyurethane foam is fed on the composite seat core material within a mold and is caused to foam thereby forming the pad and wherein a part of the raw material is allowed to foam and solidify in the interconnected void spaces of the connecting member.

The step (1) and step (2) may be carried out in this order, the step (1) may be carried out prior to the step (2), or the step (1) and step (2) may be carried out simultaneously.

Each of the above steps will be described below.

In the step (1), the substrate that comprises expanded beads which do not have through-holes, namely the first expanded beads, and which are fusion-bonded to each other is formed. Such a substrate may be obtained by any known in-mold molding process using thermoplastic resin expanded beads which do not have through-holes.

To be more specific, a thermoplastic resin as a base resin is melted and kneaded with a kneader for example. Thereafter, thermoplastic resin particles (hereinafter occasionally referred to simply as resin particles) are prepared by a method in which the resin is extruded in the form of strands, cooled and then cut into an appropriate length, or a method in which the extruded strands are cut into an appropriate length and then cooled.

As the thermoplastic resin which constitutes the resin particles, there may be used the previously described thermoplastic resin that constitutes the substrate. The thermoplastic resin may be colored by being added with a coloring pigment or dye such as black, gray or brown.

The thermoplastic resin particles are then dispersed in a dispersing medium in a closed vessel in the presence of a blowing agent and heated to a temperature that is not lower than the softening temperature of the thermoplastic resin particles so that the blowing agent is impregnated into the resin particles. Thereafter, while maintaining the pressure within the vessel at a pressure not lower than the vapor pressure of the blowing agent, one end of the vessel is opened to release the thermoplastic resin particles and the dispersing medium simultaneously to an atmosphere having a pressure lower than that within the vessel (generally atmospheric pressure) thereby expanding the thermoplastic resin particles and obtaining the first expanded beads.

As the blowing agent used for obtaining the thermoplastic resin expanded beads, there may be generally mentioned volatile organic blowing agents such as propane, isobutane, butane, isopentane, pentane, cyclopentane, hexane, cyclobutane, cyclohexane, chlorofluoromethane, trifluoromethane, 1,2,2,2-tetrafluoroethane, 1-chloro-1,1-difluoroethane, 1,1-difluoroethane and 1-chloro-1,2,2,2-tetrafluoroethane; and inorganic gas blowing agents such as nitrogen, carbon dioxide, argon and air. Above all, inorganic gas blowing agents are preferred because of their freeness of destroying the ozone layer and their low costs. Particularly preferred are nitrogen, air and carbon dioxide. The above-described blowing agents may be used as a mixture of two or more thereof. With the consideration of an effect of improving expansion ratio, a mixed blowing agent composed of carbon dioxide and butane may be used.

As the dispersing medium used for obtaining thermoplastic resin expanded beads, one which does not dissolve the resin particles may be used. Examples of such a dispersing medium include water, ethylene glycol, glycerin, methanol and ethanol. Water is generally used.

Additionally, when the thermoplastic resin particles are dispersed in the dispersing medium and heated to an expansion temperature, a dispersing agent may be used for preventing adhesion between the resin particles.

The substrate in which the first expanded beads are fusion-bonded to each other may be obtained by subjecting the first expanded beads produced in the manner described above to an in-mold molding process in which the expanded beads are filled in a mold and heated to a predetermine temperature. The molding conditions may be determined as appropriate with consideration of the object of use of the composite seat core material.

In the step (2), a connecting member that comprises thermoplastic resin expanded beads which have through-holes, namely the second expanded beads, and which are fusion-bonded to each other is produced such that interconnected void spaces which are in communication with an outer surface thereof are formed.

The second expanded beads molded body which constitutes the connecting member may be produced by a conventionally known method disclosed in, for example, Japanese Laid Open Patent Publications Nos. JP-A-1108-108441, JP-A-1107-137063 and JP-A-2012-126816, and U.S. Pat. No. 5,622,756.

To be more specific, tubular thermoplastic resin particles each having a through-hole are produced by a method similar to that for producing the resin particles for forming the substrate. In this case, there may be used a die having a slit which is provided in the molten resin exit of the extruder and which has a cross-sectional shape similar to that of the desired tubular thermoplastic resin particles. There may also be used a die which is provided with pressure control holes in the interior of the slit thereof for keeping the pressure in tubular strand holes at ambient pressure or more so as to maintain the tubular shape.

As the thermoplastic resin which constitutes the tubular resin particles, there may be used the same thermoplastic resin as that used for the production of the first expanded beads.

Next, the second expanded beads may be obtained by expanding the thermoplastic resin particles having through-holes using the method similar to that for producing the first expanded beads.

As the second expanded beads, those which are tubular and which have various shapes may be used as described previously.

The connecting member having the second expanded beads that are fusion-bonded to each other may be obtained by subjecting the second expanded beads produced in the manner described above to an in-mold molding process in which the expanded beads are filled in a mold and heated to a predetermine temperature. The molding conditions may be determined as appropriate with consideration of the object of use of the composite seat core material.

In the step (3), the connecting member is disposed on an upper side of the substrate and integrally bonded thereto, thereby obtaining a composite seat core material. In this case, it is necessary that at least part of the outer surface of the connecting member should be exposed on the upper surface of the core material.

The steps (1), (2) and (3) may be continuously carried out using a single in-mold molding device. To be more specific, the methods disclosed in, for example, Japanese patent publications Nos. JP-A-S55-11841, JP-A-S55-46938, JP-A-S55-53538, JP-A-S57-47629, JP-A-S61-130026, and JP-A-1105-116226 may be adopted.

For example, the first expanded beads are filled in a first cavity of a mold composed of a pair of male and female molds and are then heated and fusion-bonded to form the substrate (step 1). Next, the male mold thus used is substituted by another male mold so that a second cavity having a volume greater than that of the first cavity is formed. The second expanded beads are filled in a space above the substrate, that is present within the second cavity, and are then heated and fusion-bonded to form the connecting member (step 2), with simultaneous fusion-bonding thereof to the substrate (step 3), thereby obtaining the composite seat core material.

However, as described above, the bonding of the connecting member to the substrate may be carried out in a separate step by, for example, using an adhesive or by fusion bonding.

In the step (4), a liquid raw material for a polyurethane foam is fed on the core material within a mold for laminating a polyurethane foam pad.

As the liquid raw material for a polyurethane foam, there may be used a known material, as appropriate. The amount of the liquid raw material for a polyurethane foam may also be determined as appropriate according to the density of the desired polyurethane foam.

In the step (4), the liquid raw material for a polyurethane foam is caused to foam for integral lamination of the pad with the core material. In this case, the pad is formed on the core material in such a state that part of the pad enters into the interconnected void spaces either by foaming of the polyurethane foam raw material that has been impregnated within the interconnected void spaces of the connecting member at the time the polyurethane foam raw material has been fed onto the substrate or by entry of a part of the pad into the interconnected void spaces of the connecting member as a result of the pressure generated at the time the polyurethane foam raw material foams.

Because the connecting member is constituted of the second expanded beads that are fusion-bonded to each other and because the polyurethane foam enters into the spaces of the through-holes of the second expanded beads, the structure of the fusing bonding between the second expanded beads has a less tendency to be broken owing to the expansion pressure of the foam. Further, because the interconnected void spaces of the connecting member are formed by complicated interconnection of the through-holes of the second expanded beads and interstices between the second expanded beads, the connecting member and the pad are bonded to each other with a large contacting area and in a complicated form. Therefore, the connecting member and the pad are integrally laminated with a high bonding strength. Incidentally, the conditions under which the polyurethane foam raw material is foamed may be determined as appropriate according to known methods.

Thus, in the vehicular seat element according to the present invention, a part of the pad is impregnated into the interconnected void spaces of the connecting member of the composite seat core material and, therefore, the connecting member is integrally laminated with the pad. Accordingly, the bonding strength between the pad and the connecting member is excellent, i.e. delamination between the pad and the connecting member is surely suppressed. Additionally, because the connecting member is provided on only an upper side of the vehicular seat element and because a lower part of the vehicular seat element is formed of the first expanded beads that are free of through-holes, deformation attributed to the lamination of the pad is prevented. Moreover, since the amount of the pad that is impregnated into the connecting member can be controlled by adjusting the volume of the connecting member, variation of the density of the pad can be suppressed.

The seat core material of the present invention may be used for a variety of seat elements, which are desired to have cushioning properties, such as seats for vehicles, e.g. automobiles, bicycles, airplanes and electric trains, couches and chairs. The composite seat core material of the present invention is particularly suitably used, in combination with an urethane foam pad, as a seat element of vehicles such as automobiles, bicycles, airplanes and electric trains.

EXAMPLES

The following examples and comparative examples will further illustrate the present invention.

Example 1

(1) Nearly cylindrical polypropylene-based resin expanded beads which had a bulk density of 24 kg/m$^3$, a true density of 53 kg/m$^3$, an average weight per bead of 1.5 mg and an average D/L of 1.0 and which were formed with through-holes were used as second expanded beads for forming a connecting member.

(2) Polypropylene-based resin expanded beads which had a bulk density of 26 kg/m$^3$, an average weight per bead of 1.0 mg and an average D/L of 1.0 and which were free of through-holes were used as first expanded beads for forming a substrate.

The bulk density of the above expanded beads was determined as follows. A vessel having a volume of 1,000 cm$^3$ and provided with an opening at its top was provided. The expanded beads were filled in the vessel at ambient temperature and pressure. Those expanded beads that were present above the opening were removed so that the bulk height of the expanded beads nearly coincided with the opening. The weight (g) of the expanded beads in the vessel was divided by 1,000 (cm$^3$) and the unit of the result was changed to kg/m$^3$. The true density of the expanded beads was determined as follows. The expanded beads whose weight was previously measured were immersed in ethanol to measure the rise of the level, from which the volume of the expanded beads was measured. The measured volume was divided with the weight of the expanded beads and the unit of the result was changed to kg/m$^3$.

(3) Formation of the Connecting Member and Substrate:

The first expanded beads free of through-holes for forming the substrate were filled in a first cavity (rectangular parallelepiped of 350 mm×300 mm×50 mm) defined between male and female molds of a molding tool, to which was then fed steam to heat and fuse-bond the beads. Next, a second cavity (rectangular parallelepiped of 350 mm×300 mm×60 mm) whose volume was greater than that of the first cavity was formed between the female mold and another male mold which was substituted for the previously used male mold. The second expanded beads having through-holes for forming the connecting member were filled in an upper space in the second cavity, to which was then fed steam to heat and fuse-bond the beads. Thus, a composite seat core material in which the substrate and the connecting member were fusion-bonded and integrated was obtained. The connecting member and the substrate of the thus obtained core material were found to be firmly integrally fusion-bonded together.

Example 2

A composite seat core material was obtained in the same manner as in Example 1 except that the second expanded beads were imparted with increased secondary expansion efficiency by controlling the pressure of the steam that was fed at the time of molding the connecting member, so that the voidage of the connecting member was reduced to 15%.

Example 3

A composite seat core material was obtained in the same manner as in Example 1 except that the size of the first cavity was changed to 350 mm×300 mm×36 mm rectangular parallelepiped.

Comparative Example 1

The expanded beads for forming the substrate used in Example 1 were filled in a rectangular parallelepiped cavity of 350 mm×300 mm×60 mm and heated and fusion-bonded to obtain a core material having a single layer structure.

Comparative Example 2

The second expanded beads for forming the connecting member used in Example 1 were filled in a rectangular parallelepiped cavity of 350 mm×300 mm×60 mm and heated and fusion-bonded to obtain a core material having a single layer structure and interconnected void spaces that communicated with the outside.

The bulk density, voidage, volume percentage of the substrate and connecting member, and flexural rigidity relative values of the obtained core materials are shown in Table 1.

(4) Formation of Polyurethane Foam Pad:

The obtained core material was placed in a rectangular parallelepiped mold cavity of 400 mm×400 mm×100 mm, to which a raw material liquid for an in-cavity polyurethane foam was fed. The raw material liquid was then caused to foam to laminate a polyurethane foam, thereby obtaining a seat element having a laminated polyurethane foam pad.

The physical properties of the obtained seat elements are shown in Table 1.

TABLE 1

|  |  |  | Example | | | Comparative Example | |
|---|---|---|---|---|---|---|---|
|  |  |  | 1 | 2 | 3 | 1 | 2 |
| Seat core material | Substrate | Apparent density [kg/m³] | 30 | 30 | 30 | 30 | — |
|  |  | Voidage [%] | 6 | 6 | 6 | 6 | — |
|  |  | Volume percentage [volume %] | 83 | 83 | 60 | 100 | — |
|  | Connecting member | Apparent density [kg/m³] | 32 | 32 | 32 | — | 32 |
|  |  | Voidage [%] | 30 | 15 | 30 | — | 30 |
|  |  | Volume percentage [volume %] | 17 | 17 | 40 | — | 100 |
|  |  | Thickness [mm] | 10 | 10 | 24 | — | 60 |
|  | Flexural rigidity relative value | | 93 | 97 | 90 | 100 | 79 |
|  | Bonding strength between pad and core material [N] | | 243 | 170 | 240 | 30 | 240 |
|  | Deformation (warp) [mm] | | 0.6 | 0.5 | 1.8 | 0.2 | 2.9 |

Each of the physical values shown in Table 1 was measured or evaluated as follows. Shown in Table 1 are average values.

Apparent Density and Voidage of Substrate:

The obtained core material was cut into the substrate and the connecting member. The weight and outer dimensions of the cut substrate were measured. The apparent density of the substrate was calculated by dividing the weight by an apparent volume that was calculated from the outer dimensions. The substrate was immersed in ethanol. From a rise of the level of the ethanol, a true volume of the substrate was determined. The voidage of the substrate was determined according to the previously described equation (n=3).

Apparent Density and Voidage of Connecting Member:

The connecting member was cut off in the same manner as above. The weight and outer dimensions of the connecting member were measured. The apparent density of the connecting member was calculated by dividing the weight by an apparent volume that was calculated from the outer dimensions. The connecting member was immersed in ethanol. From a rise of the level of the ethanol, a true volume of the connecting member was determined. The voidage of the connecting member was determined according to the previously described equation (n=3).

Volume Percentage:

The volume percentages of the substrate and the connecting member were determined from the apparent volume of the substrate and the apparent volume of the connecting member.

Flexural Rigidity Relative Value:

A bending test was carried out by the three-point bending test according to JIS K7221-1 (2006). More specifically, from the obtained core material, a test specimen of 350 mm×100 mm (thickness was the same as that of the core material) was cut off. The three-point bending test was carried out under the conditions involving a span between fulcrums of 300 mm and a test speed of 20 mm/min to measure the maximum flexural strength (kPa). The measured maximum flexural strength was expressed as a relative value to the result of Comparative Example 1, (with the assumption that the result of Comparative Example 1 is 100) (n=5).

Bonding Strength Between Polyurethane Foam Pad and Core Material:

From the obtained seat element, a test specimen with a size of 50 mm×50 mm (thickness was the same as that of the seat element) was cut out. A SUS plate was bonded to each of the upper and bottom surfaces. A tensile test was carried out in the vertical direction using a universal testing machine (TENSIRON) at a tensile speed of 10 mm/min. The bonding strength (N) was the maximum load at which the polyurethane foam pad was delaminated from the core material (n=5).

Deformation (Warp):

The seat element was placed on a horizontal surface with its core material side being oriented downward. One end in the longitudinal direction of the seat element was pressed by a hand against the horizontal surface. The distance between the bottom surface of the core material at the other end, which was lifted, and the horizontal surface was measured (n=5).

EXPLANATION OF SYMBOLS

1: Core material
1a: Upper surface of core material
2: Substrate
3: Connecting member
3a: Part of outer surface of connecting member
4: Pad
5: Vehicular seat element
11: Tubular expanded bead
d: Inner diameter of tubular expanded bead
D: Outer diameter of tubular expanded bead
L: Length of tubular expanded bead
P: Hollow portion of tubular expanded bead

The invention claimed is:

1. A composite seat core material, comprising:
   a foamed molded substrate that comprises a multiplicity of first thermoplastic resin expanded beads which are fusion-bonded to each other and free of through-holes, and a foamed molded connecting member that comprises a multiplicity of second thermoplastic resin expanded beads each having a through-hole, said second thermoplastic resin expanded beads being fusion-bonded to each other such that interconnected void spaces which communicate with an outer surface of the foamed molded connecting member and which include part of the through-holes of the second thermoplastic resin expanded beads, are defined in the foamed molded connecting member, the foamed molded connecting member being integrally bonded to the foamed molded substrate in such a state that a part of said outer surface of the foamed molded connecting member is exposed on an upper surface of the composite seat core material.

2. The composite seat core material according to claim 1, wherein the foamed molded connecting member has an average voidage of 10% by volume or more.

3. The composite seat core material according to claim 1, wherein the foamed molded connecting member has a volume that is 5 to 50% of the volume of the composite seat core material.

4. The composite core material according to claim 1, wherein the foamed molded substrate is substantially free of void spaces.

5. A vehicular seat element, comprising:

the composite seat core material according to claim 1, and a polyurethane foam pad provided on the upper surface of the composite seat core material, wherein said polyurethane foam pad has portions impregnated through said outer surface of the foamed molded connecting member into part of the void spaces of the foamed molded connecting member.

\* \* \* \* \*